(12) United States Patent
Hsieh

(10) Patent No.: US 8,224,153 B2
(45) Date of Patent: Jul. 17, 2012

(54) VIDEO EDITING METHOD

(75) Inventor: Min-Lun Hsieh, Taipei County (TW)

(73) Assignee: Corel Corporation, Ottawa (CA)

( * ) Notice: Subject to any disclaimer, the term of this patent is extended or adjusted under 35 U.S.C. 154(b) by 1306 days.

(21) Appl. No.: 11/857,442

(22) Filed: Sep. 19, 2007

(65) Prior Publication Data
US 2009/0010609 A1 Jan. 8, 2009

(30) Foreign Application Priority Data
Jul. 5, 2007 (TW) ................................ 96124527 A

(51) Int. Cl.
*H04N 5/92* (2006.01)
*H04N 9/80* (2006.01)

(52) U.S. Cl. ........................................ 386/246; 386/239

(58) Field of Classification Search ........................ None
See application file for complete search history.

(56) References Cited

U.S. PATENT DOCUMENTS

| | | |
|---|---|---|
| 4,538,188 A | 8/1985 | Barker |
| 4,660,101 A | 4/1987 | Martin |
| 4,685,003 A | 8/1987 | Westland |
| 4,979,050 A | 12/1990 | Westland |
| 5,237,648 A | 8/1993 | Mills |
| 5,339,166 A * | 8/1994 | LeBrat et al. ................. 386/278 |
| 5,359,712 A | 10/1994 | Cohen |
| 5,442,744 A | 8/1995 | Piech |
| 5,659,793 A | 8/1997 | Escobar |
| 5,781,188 A | 7/1998 | Amiot |
| 5,999,173 A | 12/1999 | Ubilos |
| 6,154,600 A | 11/2000 | Newman |
| 6,477,315 B1 | 11/2002 | Oholori |
| 6,628,303 B1 | 9/2003 | Foreman |
| 6,956,593 B1 | 10/2005 | Gupta |
| 7,020,381 B1 | 3/2006 | Kato |
| 7,325,199 B1 | 1/2008 | Reid |
| 2006/0224940 A1 * | 10/2006 | Lee ............................. 715/500.1 |
| 2007/0140656 A1 * | 6/2007 | Ergin .............................. 386/95 |

FOREIGN PATENT DOCUMENTS
EP 0390048 A2 3/1990

OTHER PUBLICATIONS
"Ulead VideoStudio", Ulead Systems Inc. User Guide (Mar. 2006).

* cited by examiner

*Primary Examiner* — William C Vaughn, Jr.
*Assistant Examiner* — Asher Khan
(74) *Attorney, Agent, or Firm* — Patterson & Sheridan, LLP

(57) ABSTRACT

While a video stream is loaded, a subtitle information file is simultaneously loaded for displaying messages at accurate times. When contents of the video stream are required to be edited, such as an addition or deletion of video, a time variance caused by the edited video stream is first calculated, and the times for displaying the messages upon the displayed video stream are correspondingly edited according to the calculated time variances so that the messages may be accurately matched with the video stream. After the contents of the video stream require no further editing, the video stream may be combined with the messages by encoding. Therefore, image quality of the video stream is minimized.

18 Claims, 2 Drawing Sheets

VIDEO EDITING METHOD

BACKGROUND OF THE INVENTION

1. Field of the Invention

The present invention relates to a video editing method, and more particularly, to a video editing method of editing a time for displaying a message according to a calculated time variance of a video stream.

2. Description of the Prior Art

When conventional digital versatile discs (DVD) are used for displaying videos, information stored on the digital versatile discs includes a huge quantity of video streams and corresponding message-related information, i.e., subtitle information files. While displaying contents of a conventional digital versatile disc, a video stream stored on the conventional digital versatile disc is loaded first, then a corresponding message and a time for displaying the corresponding message are loaded from a subtitle information file to display the loaded video stream and the loaded message on a screen together. The subtitle information file may include conventional text or text bitmaps displayed in forms of images.

Sometimes, a user requires adding to, or deleting from contents of a video stream, and therefore the time stored in the subtitle information file for displaying the message is required to be shifted. However, since contents burned onto a conventional digital versatile disc cannot be modified, the subtitle information file stored on the conventional digital versatile disc cannot be directly edited by the user. The time for displaying the message may only be edited when both the video stream and the subtitle information file are copied onto a hard drive or another storage unit, in which the user may proceed with editing.

Conventionally speaking, there are two methods for the user to edit the subtitle displayed with the video.

In the first method, with the aid of a tool program, the user combines the video stream with the message, and then utilizes an additional video editing program for performing video editing. However, image quality of the combined video stream has been damaged so that an original image quality cannot be recovered. Moreover, if contents in the combined video stream have to be added or deleted, the user has to decode the combined video stream back to an original video stream and the message, and manually matches the time for displaying the message with the video stream according to the added or deleted contents to meet requirements of the user in displaying the proper message along with the video stream. Repeated encoding and decoding of the video stream are used in the first method so that the image quality of the video stream is significantly and repeatedly damaged as well.

In the second method, with the aid of a tool program, the user fetches the original video stream, which has not been combined with the message, and loads the original video stream into an image editing program. While using the image editing program, the user establishes the message to be displayed along with the video stream in the subtitle information file, and manually matches the established message with the accurate time for displaying the message according to desired requirements. In the second method, the user requires complicated steps for matching the displayed message with the accurate time or an accurate duration corresponding to the original video stream. Though the second method retains the image quality of the original video stream, precisely matching the displayed message with the accurate time is tiresome for the user.

In summary, the abovementioned methods result in repeated damage to the image quality of the video stream or a huge effort by the user in editing the time for displaying the message along with the video stream. These conditions bring significant inconveniences for the user while the user attempts to edit the video stream.

SUMMARY OF THE INVENTION

A video editing method comprises setting a time for displaying a message, calculating a time variance caused by editing a video stream after editing the video stream, and editing the time for displaying the message according to the time variance.

These and other objectives of the present invention will no doubt become obvious to those of ordinary skill in the art after reading the following detailed description of the preferred embodiment that is illustrated in the various figures and drawings.

DETAILED DESCRIPTION

A video editing method for editing the time for displaying the message along with the video stream according to a calculated time variance of the video stream is provided, for solving the problem of damaged image quality, of difficulties involved in editing the time for displaying the message manually, and of associated problems easily leading to an erroneous time for displaying the message.

Figure 1:
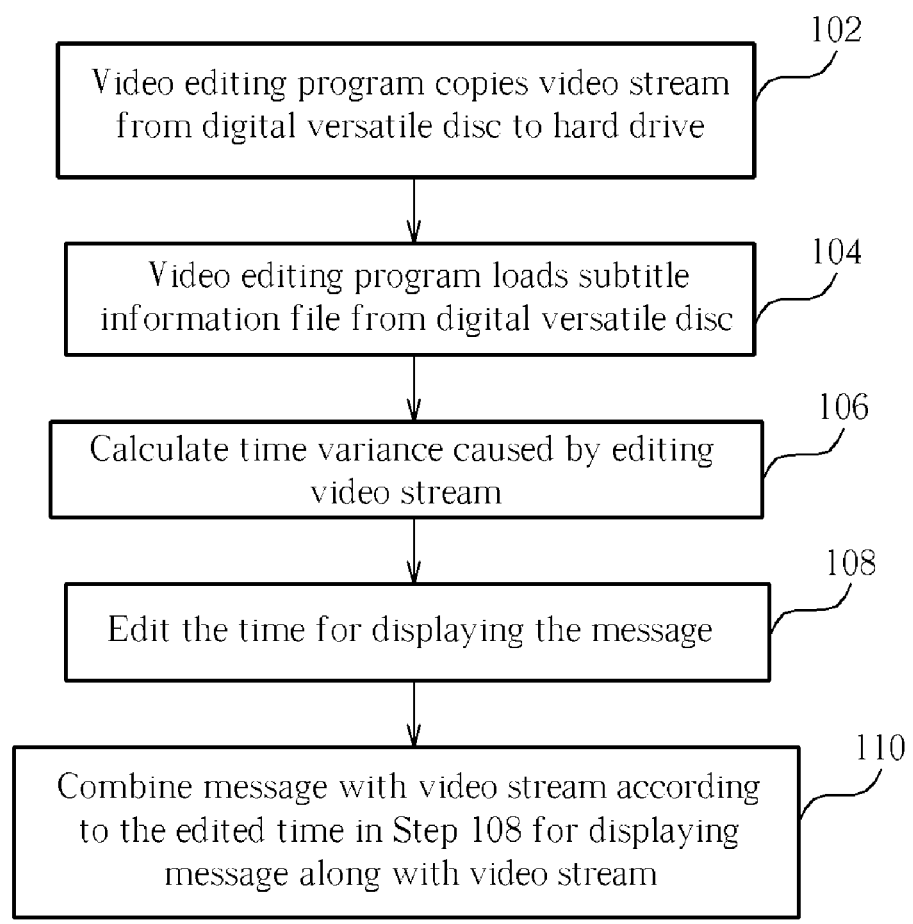
FIG. 1 is a flowchart of the video editing method provided in the present invention.
Figure 2:
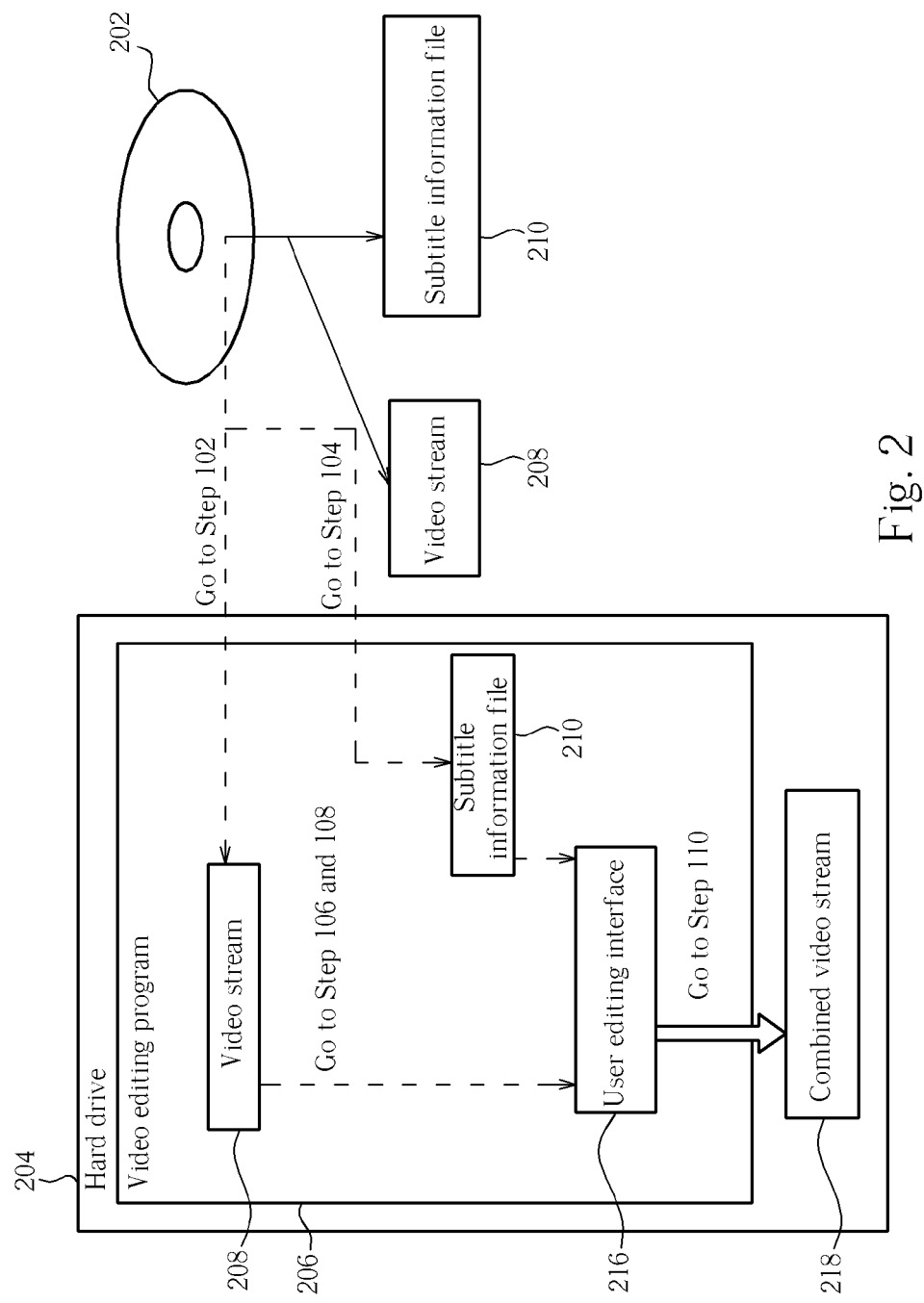
FIG. 2 is a concrete diagram for demonstrating steps shown in FIG. 1.

Please refer to FIG. 1, which is a flowchart of the video editing method provided in the present invention. And please refer to FIG. 2 as well, where FIG. 2 is a concrete diagram for demonstrating steps shown in FIG. 1. In FIG. 1, steps of the video editing method provided in the present invention are listed as follows.

Step 102: A video editing program 206 copies a video stream 208 from a digital versatile disc 202 into a hard drive 204.

Step 104: The video editing program 206 loads a subtitle information file 210 from the digital versatile disc 202, where the subtitle information file 210 records messages and a time for displaying each message while displaying the video stream 208.

Step 106: Calculate a time variance caused by editing the video stream 208.

Step 108: Edit the time for displaying the message while the video stream 208 is displayed according to the calculated time variance in Step 106.

Step 110: Combine the message with the video stream 208 according to the edited time in Step 108 for displaying the message along with the video stream 208.

In the video editing method illustrated in FIG. 1 and FIG. 2, the digital versatile disc 202 stores the video stream 208 without the subtitle or the texts and stores the subtitle information file 210. The subtitle information file 210 records each message and the time for displaying the message while the video stream 208 is displayed. Note that the message may be text, an image, or a text bitmap.

First, the video stream 208 is loaded from the digital versatile disc 202 into the video editing program 206 of the hard drive 204. Then the video editing program 206 reads the subtitle information file 210, overlaps the video stream 208 with the message on an accurate time according to information stored in the subtitle information file 210, and provides the video stream 208 along with the overlapped message to the user so that the user may edit with the aid of a user editing interface 216.

In Step 106 and Step 108, when addition to or deletion from contents of the video stream 208 is desired, the time recorded in the subtitle information file 210 for displaying the message is also required to be edited accordingly. Therefore, when the edited video stream 208 is displayed, the message may still be displayed at the accurate time. The following descriptions disclose embodiments of the video editing method of the present invention according to Step 106 and Step 108 under different conditions. Note that when the video editing program 206 provides the function of dragging a time bar shown on a user interface, where the time bar indicates the times for displaying different contents of the video stream 208, the video editing program 206 calculates shifted time variances caused by dragging the video stream 208 within the user interface in a simultaneous manner according to embodiments of the present invention.

Under a first condition, the user adds contents to the video stream 208. According to the video editing method of the present invention, a shifted (or delayed) time variance of the message generated by the added contents, is first calculated. When the added contents are displayed before the time for displaying a message, where the time is recorded in the subtitle information file 210, the time for displaying the message is delayed by the calculated time variance within the subtitle information file 210. Otherwise, when the added contents are displayed after the time for displaying a message, the time for displaying the message is not edited. For example, when the time variance corresponding to the added contents of the video stream 208 is 3 seconds, and when the added contents are displayed before the time for displaying a message, the time for displaying the message is delayed by 3 seconds within the subtitle information file 210 for matching with the added contents. Similarly, when the time variance corresponding to the added contents of the video stream 208 is 3 seconds, and when the added contents are displayed after the time for displaying a message, the time for displaying the message is not shifted within the subtitle information file.

Under a second condition, the user deletes certain contents of the video stream 208. According to embodiments of the present invention, a shifted (or advanced) time variance is first calculated according to the deleted contents of the video stream 208. When the deleted contents are displayed before the time for displaying a message, the time for displaying the message is advanced by the calculated time variance within the subtitle information file 210. Otherwise, when the deleted contents are displayed after the time for displaying a message, the time for displaying the message is not shifted within the subtitle information file 210. For example, when the calculated time variance corresponding to the deleted contents of the video stream 208 is 3 seconds, and when the deleted contents are displayed before the time for displaying a message, the time for displaying the message is advanced by 3 seconds within the subtitle information file 210 for matching the deleted contents. Similarly, when the calculated time variance corresponding to the deleted contents of the video stream 208 is 3 seconds, and when the deleted contents are displayed after the time for displaying a message, the time for displaying the message is not required to be shifted within the subtitle information file 210.

Note that in Step 106 and Step 108, the message, which is recorded within the subtitle information file 210, is still overlapped with the video stream 208 so that the message has not been physically combined with the video stream 208. Therefore, the image quality of the video stream 208 has not been damaged.

When the time for displaying the message is not required to be shifted anymore, the message may be combined with the video stream 208 by encoding to generate a combined video stream 218, which is provided to the user to display or watch.

Note that applications of the video editing method of the present invention are not limited to a digital versatile disc or a hard drive. In other words, the video stream and the subtitle information file are not necessarily loaded from a digital versatile disc or loaded into a hard drive. According to available embodiments of the present invention, the digital versatile disc may be replaced by a Blu-Ray disc or a high definition DVD (HD-DVD). The video editing method of the present invention is not limited to the abovementioned applications.

In the video editing method of the present invention, the image quality of the video stream is merely damaged within the procedure for combining the message with the video stream by encoding. Therefore, compared with the defect of repeatedly damaging the image quality of the video stream, the damages to the image quality of the video stream are minimized so that the displayed video stream, which has been combined with the message by encoding, preserves most of the original image quality. Besides, since the time for displaying the message is edited (or shifted) according to a calculated time variance, which is generated by adding or deleting contents of the video stream, the time for displaying the message is accurately edited. Therefore, the time for displaying the message is not erroneously mis-shifted by the user, and the difficulties involved in matching the message with the video stream are thus avoided.

Those skilled in the art will readily observe that numerous modifications and alterations of the device and method may be made while retaining the teachings of the invention.

What is claimed is:

1. A video editing method comprising:
    setting a time for displaying a message concurrent with a portion of a video stream, wherein the message is stored independently from the video stream;
    receiving one or more edits to modify content of the video stream;
    applying the one more edits to the modify the content of video stream;
    calculating, by operation of one or more processors, a time variance caused by applying the one or more edits to the video stream after editing the video stream; and
    editing the time for displaying the message according to the calculated time variance.

2. The method of claim 1, wherein calculating the time variance caused by applying the one or more edits to the video stream comprises:
    calculating the time variance resulting from applying at least one of the edits to add content to the video stream prior to the time for displaying the message; and
    wherein editing the time for displaying the message according to the time variance comprises delaying the time for displaying the message according to the time variance resulting from adding the content to the video stream, wherein the added content is displayed before displaying the message.

3. The method of claim 1, wherein calculating the time variance caused by applying the one or more edits to the video stream comprises:

calculating the time variance resulting from applying at least one of the edits to delete content of the video stream prior to the time for displaying the message; and wherein editing the time for displaying the message according to the time variance comprises advancing the time for displaying the message according to the time variance resulting from applying at least one of the edits to delete content from the video stream.

4. The method of claim 1, further comprising: combining the video stream with the message.

5. The method of claim 1, further comprising:
loading the video stream from a digital versatile disc (DVD), a Blu-Ray disc, or a high definition DVD (HD-DVD).

6. The method of claim 1, wherein setting the time for displaying the message comprises:
setting the time for displaying the message having formats of text bitmaps, plain texts, symbols, or images.

7. A non-transitory computer readable medium storing a program, which, when executed on a processor, performs a video editing operation, comprising:
setting a time for displaying a message concurrent with a portion of a video stream, wherein the message is stored independently from the video stream;
receiving one or more edits to modify content of the video stream;
applying the one more edits to the modify the content of video stream;
calculating a time variance caused by applying the one or more edits to the video stream after editing the video stream; and
editing the time for displaying the message according to the calculated time variance.

8. The non-transitory computer readable medium of claim 7, wherein calculating the time variance caused by applying the one or more edits to the video stream comprises:
calculating the time variance resulting from applying at least one of the edits to add content to the video stream prior to the time for displaying the message; and
wherein editing the time for displaying the message according to the time variance comprises delaying the time for displaying the message according to the time variance resulting from adding the content to the video stream, wherein the added content is displayed before displaying the message.

9. The non-transitory computer readable medium of claim 7, wherein calculating the time variance caused by applying the one or more edits to the video stream comprises:
calculating the time variance resulting from applying at least one of the edits to delete content of the video stream prior to the time for displaying the message; and
wherein editing the time for displaying the message according to the time variance comprises advancing the time for displaying the message according to the time variance resulting from applying at least one of the edits to delete content from the video stream.

10. The non-transitory computer readable medium of claim 7, wherein the operation further comprises:
combining the video stream with the message.

11. The non-transitory computer readable medium of claim 7, wherein the operation further comprises:
loading the video stream from a digital versatile disc (DVD), a Blu-Ray disc, or a high definition DVD (HD-DVD).

12. The non-transitory computer readable medium of claim 7, wherein setting the time for displaying the message comprises:
setting the time for displaying the message having formats of text bitmaps, plain texts, symbols, or images.

13. A system, comprising:
a storage device storing a video stream and a message;
a processor; and
a memory storing a video editing program, which, when executed on a processor performs a video editing operation, comprising:
setting a time for displaying a message concurrent with a portion of a video stream, wherein the message is stored independently from the video stream,
receiving one or more edits to modify content of the video stream, applying the one more edits to the modify the content of video stream,
calculating a time variance caused by applying the one or more edits to the video stream after editing the video stream, and
editing the time for displaying the message according to the calculated time variance.

14. The system of claim 13, wherein calculating the time variance caused by applying the one or more edits to the video stream comprises:
calculating the time variance resulting from applying at least one of the edits to add content to the video stream prior to the time for displaying the message; and
wherein editing the time for displaying the message according to the time variance comprises delaying the time for displaying the message according to the time variance resulting from adding the content to the video stream, wherein the added content is displayed before displaying the message.

15. The system of claim 13, wherein calculating the time variance caused by applying the one or more edits to the video stream comprises:
calculating the time variance resulting from applying at least one of the edits to delete content of the video stream prior to the time for displaying the message; and
wherein editing the time for displaying the message according to the time variance comprises advancing the time for displaying the message according to the time variance resulting from applying at least one of the edits to delete content from the video stream.

16. The system of claim 13, wherein the operation further comprises:
combining the video stream with the message; and
storing the combined video stream on the storage device.

17. The system of claim 13, wherein the operation further comprises:
loading the video stream from a digital versatile disc (DVD), a Blu-Ray disc, or a high definition DVD (HD-DVD).

18. The system of claim 13, wherein setting the time for displaying the message comprises:
setting the time for displaying the message having formats of text bitmaps, plain texts, symbols, or images.

* * * * *